Patented Feb. 26, 1929.

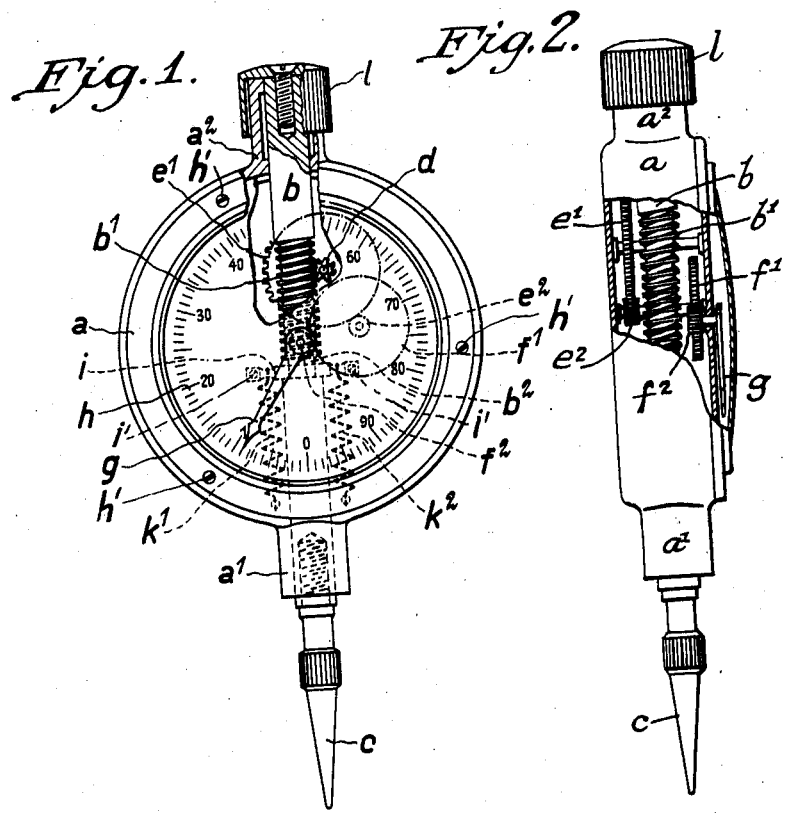
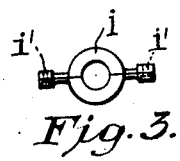

1,703,120

UNITED STATES PATENT OFFICE.

ADOLF STEINLE, OF JENA, GERMANY, ASSIGNOR TO THE FIRM CARL ZEISS, OF JENA, GERMANY.

MEASURING DEVICE.

Application filed April 18, 1925, Serial No. 24,294, and in Germany May 13, 1924.

The present invention relates to a precision measuring device in which the rectilinear motion of a caliper pin is converted into a circular motion of an index relatively to a scale. To this end the new device contains a screw spindle which engages in a toothed wheel and which is displaceable in the direction of its axis and rotatable about the same. With a displacement of this spindle their teeth act like those of a rack and bring about the displacement, serving for carrying out the measurement, of the index relatively to the scale. A rotation of the spindle causes a fine displacement of the index relatively to the scale and serves for the adjustment of the device.

The annexed drawing shows in Fig. 1 in a plan view and in Fig. 2 in a side view a dial gauge as an example of the invention, part of the structure in each figure being removed to show interior construction; Fig. 3 represents in an elevation a single part of the dial gauge.

In the example shown in the drawing in two extensions $a^1$ and $a^2$ of the casing $a$ there is rotatably and displaceably supported a screw spindle $b$ which is provided at the one end with a caliper pin $c$ projecting from the casing $a$. The threads $b^1$ of the spindle $b$ act as a rack and mesh with a toothed wheel $d$, whose rotations are transmitted to a rotatable index $g$ by means of a gear consisting of two pairs of toothed wheels $e^1$, $e^2$ and $f^1$, $f^2$. The index $g$ shows the amount of the motion of the caliper pin $c$ in the axial direction of the spindle $b$ on a correspondingly gauged scale $h$, fixed on the casing $a$ by means of screws $h^1$. The spindle $b$ has a recess $b^2$. In the latter is supported a two-part ring $i$, which is rotatable on the spindle $b$ and held together by screws $i'$ and on which act two springs $k^1$ and $k^2$ by which the caliper pin $c$ is always pulled out of the casing $a$ as far as possible. As a stop for the spindle $b$ serves a milled head $l$, which is screwed to the free end of the spindle $b$ and by means of which the spindle $b$ may be rotated about its axis in order to exactly adjust the index $g$.

When carrying out measurements, the operation of the dial gauge is the same as in the ordinary dial gauges. In order to adjust the index $g$ relatively to the scale $h$ the spindle $b$ should be turned by means of the milled head $l$.

I claim:

A measuring device, comprising a casing, a circular scale fixed on this casing, an index, means for supporting said index in the casing for rotation about the centre of this scale, a toothed wheel rotatably supported in the casing, means adapted to couple the toothed wheel and the index, a screw spindle axially displaceable and axially rotatable in the casing and meshing with the toothed wheel, and a caliper pin fixed on the said screw spindle.

ADOLF STEINLE.